United States Patent
Cahill et al.

(10) Patent No.: US 10,852,906 B2
(45) Date of Patent: Dec. 1, 2020

(54) SYSTEM AND METHOD FOR IDENTIFYING LOCATIONS FOR VIRTUAL ITEMS WITHIN A PHYSICAL ENVIRONMENT

(71) Applicant: Microsoft Technology Licensing, LLC, Redmond, WA (US)

(72) Inventors: Jason Matthew Cahill, Woodinville, WA (US); Torfi Frans Olafsson, Kirkland, WA (US); Irina Koulinitch, Seattle, WA (US); Stacy Jiayan Chen, Redmond, WA (US); Jesse Dylan Merriam, Bothell, WA (US); Michael Meincke Persson, Redmond, WA (US); Bradley Reid Shuber, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/277,465

(22) Filed: Feb. 15, 2019

(65) Prior Publication Data
US 2020/0264757 A1    Aug. 20, 2020

(51) Int. Cl.
*G06F 3/048* (2013.01)
*G06T 19/00* (2011.01)
(Continued)

(52) U.S. Cl.
CPC .......... *G06F 3/04815* (2013.01); *A63F 13/65* (2014.09); *A63F 13/79* (2014.09); *G06F 16/909* (2019.01); *G06T 19/006* (2013.01)

(58) Field of Classification Search
None
See application file for complete search history.

(56) References Cited

U.S. PATENT DOCUMENTS 9,230,368 B2    1/2016   Keane et al.
9,352,216 B2    5/2016   Mullen
(Continued)

FOREIGN PATENT DOCUMENTS

WO    2015192117 A1    12/2015
WO    2016099906 A2    6/2016

OTHER PUBLICATIONS

Poupyrev, Ivan, "3D Manipulation Techniques", In Proceedings of SIGGRAPH 27th Annual Conference on Computer Graphics and Interactive Techniques, Jul. 23, 2000, 31 Pages.
(Continued)

*Primary Examiner* — Nurun N Flora
(74) *Attorney, Agent, or Firm* — Paul W. Mitchell (57) ABSTRACT

Described herein is a system and method for identifying locations for virtual items within a physical environment. For each of a plurality of users, information is received regarding the user's interaction with a one or more interactive virtual items presented on a map of a virtual environment that parallels at least portions of the physical environment. The information comprises the user's physical location when interacting with a particular interactive item. Each interactive virtual item has an associated physical location within the physical environment. The received information is aggregated over time to determine an associated physical location within the physical environment for the virtual item. With the virtual environment, the virtual item is placed at the determined associated physical location.

19 Claims, 7 Drawing Sheets

US 10,852,906 B2
Page 2

(51) Int. Cl.
*G06F 16/90* (2019.01)
*A63F 13/79* (2014.01)
*A63F 13/65* (2014.01)
*G06F 3/0481* (2013.01)
*G06F 16/909* (2019.01)

(56) References Cited

U.S. PATENT DOCUMENTS

| | | | |
|---|---|---|---|
| 9,384,594 | B2 | 7/2016 | Maciocci et al. |
| 9,685,005 | B2 | 6/2017 | Kjallstrom et al. |
| 9,696,547 | B2 | 7/2017 | Kinnebrew et al. |
| 9,782,668 | B1 * | 10/2017 | Golden ................ A63F 13/332 |
| 2012/0212484 | A1 | 8/2012 | Haddick et al. |
| 2012/0315992 | A1 | 12/2012 | Gerson et al. |
| 2017/0270711 | A1 * | 9/2017 | Schoenberg ......... G02B 27/017 |
| 2018/0045963 | A1 | 2/2018 | Hoover et al. |
| 2018/0321894 | A1 | 11/2018 | Paulovich et al. |
| 2018/0361248 | A1 | 12/2018 | Nomura et al. |

OTHER PUBLICATIONS

"Deep Learning Creates Earth-like Terrain by Studying NASA Satellite Images", Retrieved from: https://www.technologyreview.com/s/608316/deep-learning-creates-earth-like-terrain-by-studying-nasa-satellite-images/, Jul. 20, 2017, 9 Pages.

"Make the World your Playground", Retrieved from: https://web.archive.org/web/20200106051532/https:/cloud.google.com/maps-platform/gaming/, Jan. 6, 2020, 14 Pages.

"Minecraft Earth FAQs", Retrieved from: https://web.archive.org/web/20200107104411/https:/help.minecraft.net/hc/en-us/articles/360033744412-Minecraft-Earth-FAQs, Jan. 7, 2020, 10 Pages.

Coldewey, Devin, "Minecraft-Earth-Makes-the-Whole-Real-World-Your-Very-Own-Blocky-Realm", Retrieved from: https://techcrunch.com/2019/05/17/minecraft-earth-makes-the-whole-real-world-your-very-own-blocky-realm/, May 17, 2019, 18 Pages.

Orland, Kyle, "Niantic Rolls out Suggestion System for New Pokemon Go Locations", Retrieved from: https://arstechnica.com/gaming/2018/09/niantic-rolls-out-suggestion-system-for-new-pokemon-go-locations/, Sep. 14, 2018, 7 Pages.

Soute, et al., "Head Up Games: Combining the Best of Both Worlds by Merging Traditional and Digital Play", In journal of Personal and Ubiquitous Computing, vol. 14, Issue 5, Dec. 17, 2009, pp. 435-444.

Weth, et al., "Virtual Location-Based Services:Merging The Physical And Virtual World", In Proceedings of IEEE International Conference on Web Services, Oct. 10, 2013, pp. 113-120.

Youm, et al., "Design and Development Methodologies of Kkongalmon, a Location-Based Augmented Reality Game Using Mobile Geographic Information", In EURASIP Journal on Image and Video Processing volume, Jan. 3, 2019, pp. 1-11.

"SwiftShot: Creating a Game for Augmented Reality Apple Developer Documentation", Retrieved from: https://developer.apple.com/documentation/arkit/swiftshot_creating_a_game_for_augmented_reality, Jan. 19, 2019, 4 Pages.

"Tango (Platform)—Wikipedia", Retrieved from: https://en.wikipedia.org/w/index.php?t, Apr. 27, 2017, 6 Pages.

"International Search Report and Written Opinion Issued in PCT Application No. PCT/US2020/015990", dated May 13, 2020, 12 Pages.

Schussler, Nadine, "Processing GPS Raw Data Without Additional Information", Retrieved from https://www.research-collection.ethz.ch/bitstream/handle/20.500.11850/9472/eth-30636-01.pdf?sequence=1, Dec. 31, 2009, 17 Pages.

* cited by examiner

SYSTEM AND METHOD FOR IDENTIFYING LOCATIONS FOR VIRTUAL ITEMS WITHIN A PHYSICAL ENVIRONMENT

BACKGROUND

Virtual reality video games can include a virtual environment that parallels at least parts of a physical environment. A user can be represented in the virtual environment as an avatar. User movement(s) within the physical environment (e.g., real world) can cause corresponding avatar movement(s) within the virtual environment. For example, during gameplay, as a user walks down a particular street, the user's avatar can be moved down a corresponding street in the virtual environment.

SUMMARY

Described herein is a system for identifying a location for a virtual item within a physical environment, comprising: a computer comprising a processor and a memory having computer-executable instructions stored thereupon which, when executed by the processor, cause the computer to: for each of a plurality of users, receiving information regarding the user's interaction with a one or more interactive virtual items presented on a map of a virtual environment that parallels at least portions of the physical environment, the information comprising the user's physical location when interacting with a particular interactive item, each interactive virtual item having an associated physical location within the physical environment; aggregating the received information over time to determine an associated physical location within the physical environment for the virtual item; and, within the virtual environment, placing the virtual item at the determined associated physical location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to identifying location(s) for virtual item(s) within a physical environment are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding identifying location(s) for virtual item(s) within a physical environment. What follows are one or more exemplary systems and methods.

Aspects of the subject disclosure pertain to the technical problem of identifying location(s) for virtual item(s) within a physical environment. The technical features associated with addressing this problem involve, for each of a plurality of users, receiving information regarding the user's interaction with one or more interactive virtual items presented on a map of a virtual environment that parallels at least portions of the physical environment, the information comprising the user's physical location when interacting with a particular interactive item, each interactive virtual item having an associated physical location within the physical environment; aggregating the received information over time to determine an associated physical location within the physical environment for a virtual item; and, within the virtual environment, placing the virtual item at the determined associated physical location. Accordingly, aspects of these technical features exhibit technical effects of more efficiently and effectively locating virtual item(s) within a physical environment, for example, reducing consumption of computer resource(s) and/or network bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

As used herein "user gaming device" refers to a moveable individual computing device including, for example, a mobile phone, a laptop, a tablet, a phablet, a personal digital assistant ("PDA"), an e-reader, a wearable computer, a head-mounted display (HMD), or any other moveable computing device having components for interacting with a virtual reality system and/or an augmented reality system.

Virtual reality video games can include a virtual environment that parallels at least parts of a physical environment. A user can be represented in the virtual environment, for example, as an avatar. User movement(s) within the physical environment (e.g., real world) can cause corresponding movement(s) (e.g., of the avatar) within the virtual environment as displayed on a user gaming device. Augmented reality video games display a real world image and/or video overlaid with a virtual gaming experience (e.g., interactive three-dimensional object(s)).

In order to provide a rich gaming experience, interactive virtual item(s) can be dispersed throughout specific physical area(s) where gaming (e.g., virtual reality gaming and/or augmented reality gaming) is expected and/or encouraged to occur, with each interactive virtual item having an associated physical location. In this manner, particular interactive virtual item(s) can be displayed on a user gaming device (e.g., mobile phone) when a user is in physical proximity of the associated physical location associated with the particular interactive virtual item(s) (e.g., within a threshold distance of the physical location associated with the particular interactive virtual item(s)).

Described herein is a system and method for identifying locations for virtual items within a physical environment. In some embodiments, the interactive virtual item(s) can be initially located using one or more initial placement algorithms. As users interact with particular virtual items, information regarding the user's physical location when interacting with the particular virtual item, and, the associated physical location of the particular virtual item, can be tracked and aggregated. The aggregated information can then be utilized to identify locations for virtual items within the physical environment. In some embodiments, the aggregated information can be utilized to provide a suitable physical location for an augmented reality video encounter. In some embodiments, the aggregated information can be utilized to more suitably locate the interactive virtual item(s) (e.g., refine or adjust physical locations of initially or subsequently placed virtual items).

The system and method can thus, over time, derive locations where users usually interact. In cases where interactions exceed a threshold quantity, the system and method can infer that these particular locations are a preferable place to play (e.g., a virtual reality video game and/or an augmented reality video game).

Figure 1:
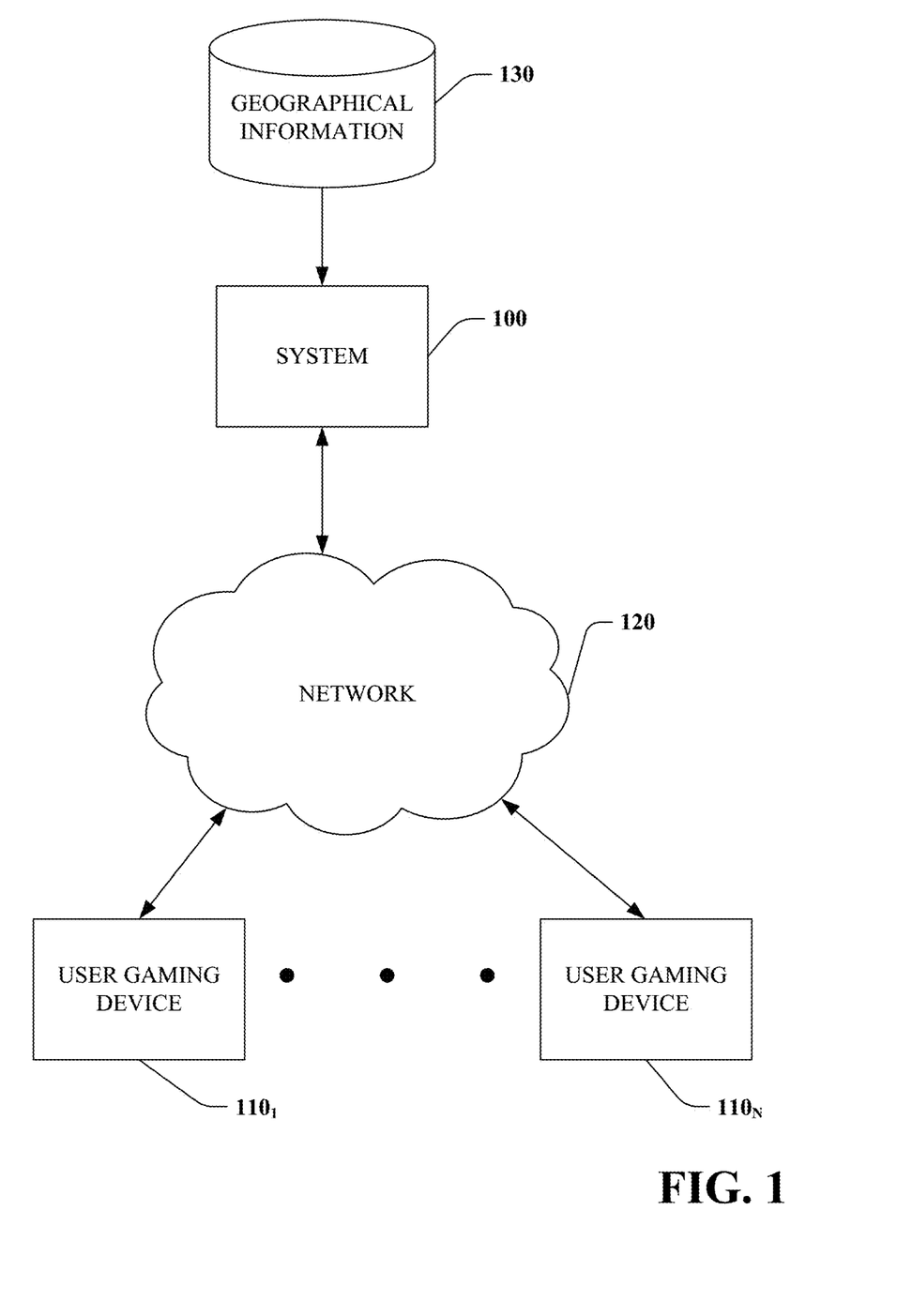
FIG. 1 is a functional block diagram that illustrates a system for identifying locations for virtual items within a physical environment.

Referring to FIG. 1, a system for identifying a location for a virtual item within a physical environment 100 is illustrated. The system 100 can be coupled to one or more user gaming device 110 via a network 120 such as the Internet.

Interactive virtual item(s) can be initially located using one or more initial placement algorithms. As users interact with particular virtual items, information regarding the user's physical location when interacting with the particular virtual item, and, the physical location associated with the particular virtual item, can be tracked and aggregated by the system 100. The aggregated information can then be utilized by the system 100 to identify locations associated with virtual items within the physical environment.

In some embodiments, the system 100 can be a component of an augmented reality experience system (e.g., augmented reality video game system) (not shown). In some embodiments, the system 100 can be a component of a virtual reality experience system (e.g., virtual reality video game system) (not shown).

"Virtual items" are computer-generated sounds, images, animations, and/or experiences which visually and/or audibly enhance a user's virtual reality experience and/or augmented reality experience via a user gaming device 110. While the virtual items do not exist in the physical environment, each virtual item can be assigned a physical location in the physical environment (e.g., real world) in which interaction with the virtual item can occur. A particular virtual item can be assigned a physical location (e.g., set of map coordinates) such that when a user gaming device is within a threshold distance of the assigned physical location, the user can experience the virtual item via the user gaming device 110. For example, the user can hear a particular sound, interact with a particular virtual three-dimensional image, and/or experience a particular three-dimensional encounter via the user gaming device 110.

In some embodiments, the virtual items can be associated with a virtual reality video game and/or an augmented reality video game. During a virtual reality gaming and/or augmented reality gaming, the user can interact with particular virtual items in a positive manner, such as gathering blocks, tools, resources, etc. to build structures/scenes. The user interact can interact with particular virtual items in a negative manner such as encountering gaming obstacles or foes during the virtual reality gaming and/or augmented reality gaming.

In some embodiments, the system 100 can determine initial placement (e.g., associated physical locations) of interactive virtual items in accordance with one or more initial placement algorithms. The system 100 can further, for each of a plurality of users, receive information regarding the user's interaction with a one or more interactive virtual items presented (e.g., displayed) on a map of a virtual environment that parallels at least portions of a physical environment, the information comprising the user's physical location when interacting with a particular interactive item, each interactive virtual item having an associated physical location within the physical environment.

The system 100 can also aggregate the received information over time to infer/determine an associated physical location within the physical environment for a particular virtual item. The system 100 can further, within the virtual environment, place the virtual item at the determined associated physical location.

In some embodiments, the system 100 can utilize geographical information 130 received from one or more mapping services (e.g., OpenStreetMap (OSM) (a collaborative project where a map is created and maintained by volunteers)), for example, to initially place the virtual items. The geographical information 130 can be presented as a plurality of tiles, with each tile representing a particular geographical location. This geographical information 130 can include points of interest, travel ways such as highway, road, footpaths, etc., parks and the like.

Using the received geographical information 130, the system 100 can identify locations in which gaming is not expected or encouraged to occur. In some embodiments, these locations can include, without limitation, correctional institutions, military bases, waste facilities, and the like. Virtual items are not placed (have associated physical locations) in locations identified in which gaming is not expected or encouraged to occur.

In some embodiments, based at least in part upon the received geographical information 130, the system 100 can further identify locations in which gaming in not likely to be expected or encouraged to occur. In some embodiments, this can include, without limitation, highways, roadways, and/or where vehicular traffic generally occurs. Virtual items are not placed (have associated physical locations) in locations identified in which gaming is not likely expected or encouraged to occur.

Similarly, the received geographic information 130 can be utilized by the system 100 to identify locations in which is gaming is expected or encouraged to occur. In some embodiments, these locations can include known physical locations associated with entity(ies) (e.g., business(es)) which have expressed interest in having gaming occur, for example, particular stores, particular malls, and/or other commercial institutions. In some embodiments, these locations can include public spaces such as parks, town squares, historic points of interest, etc. Virtual items can be placed in at least some of the locations in which gaming is identified as expected or encouraged to occur.

In some embodiments, the received geographic information 130 can result in a subset of locations for which the system 100 cannot initially infer whether or not gaming is expected or encouraged to occur. For at least some of this subset of location, the system 100 can utilize a pattern to disperse virtual items across particular geographical area (e.g., tile). In some embodiments, the virtual items can be dispersed in a regular pattern, for example, with associated physical locations corresponding to a ten foot by ten foot grid. In some embodiments, the virtual items can be dispersed in a scattered or random manner, that is, the associated physical locations appearing scattered or in a random pattern across a particular geographical area (e.g., tile). In some embodiments, the virtual items can be located using general sparseness rules to determine placement latitude and longitude.

Once a plurality of virtual items have been initially placed, one or more interactive virtual items can be displayed to the user via the user gaming device 110 when the user gaming device 100 is in proximity (e.g., threshold distance) of the associated physical location(s) of the particular one or more interactive virtual items.

Figure 2:
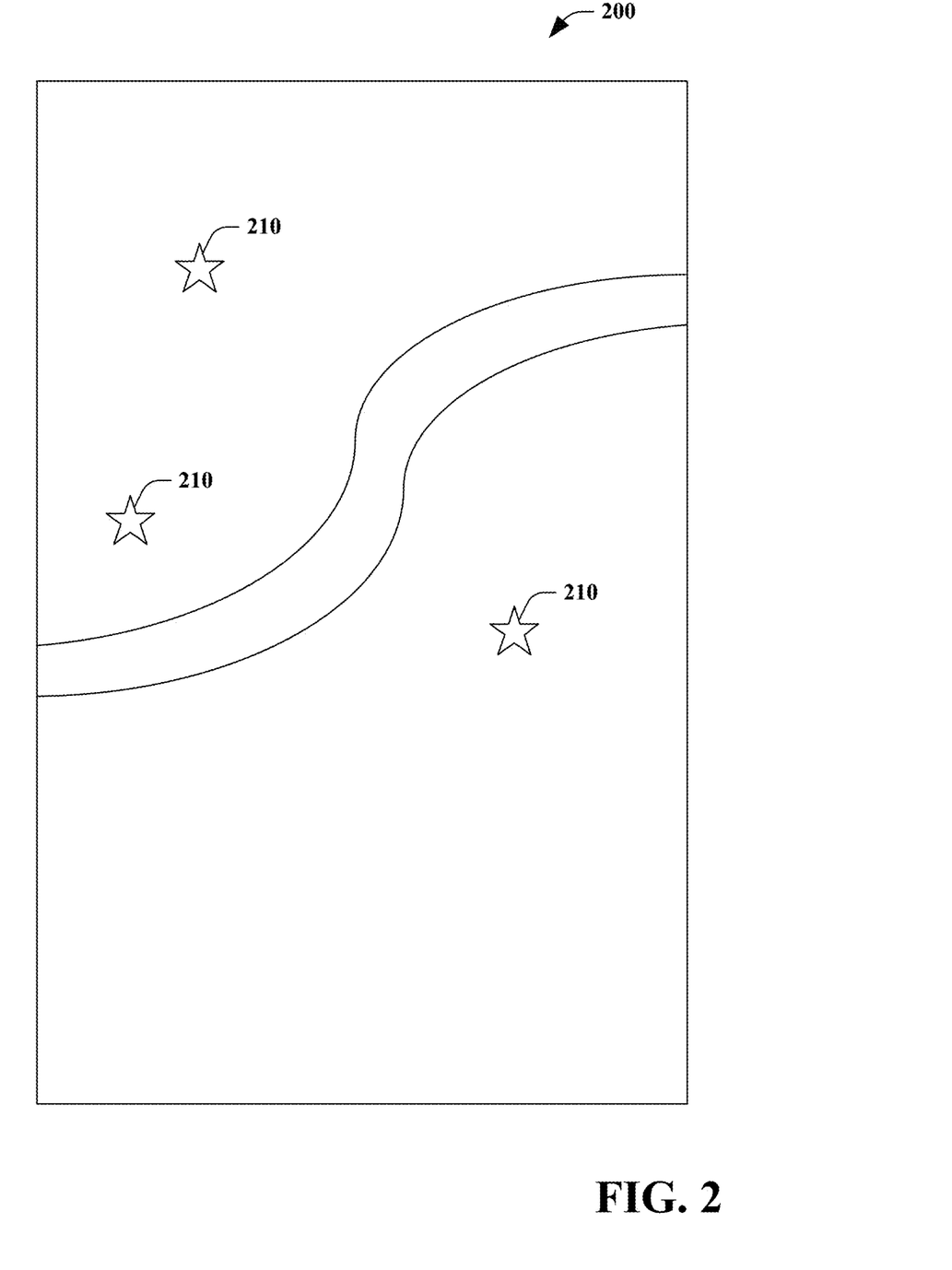
FIG. 2 is a diagram that illustrates an exemplary user interface.

Referring briefly to FIG. 2, an exemplary user interface 200 is illustrated. The user interface 200 displays a map of a virtual environment that parallels at least portions of a physical environment. The user interface 200 includes a plurality of interactive virtual items 210 displayed at various locations. The user can interact with zero, one or more of the interactive virtual items 210. For purposes of explanation and not limitation, the interactive virtual items 210 are displayed as stars.

Figure 3:
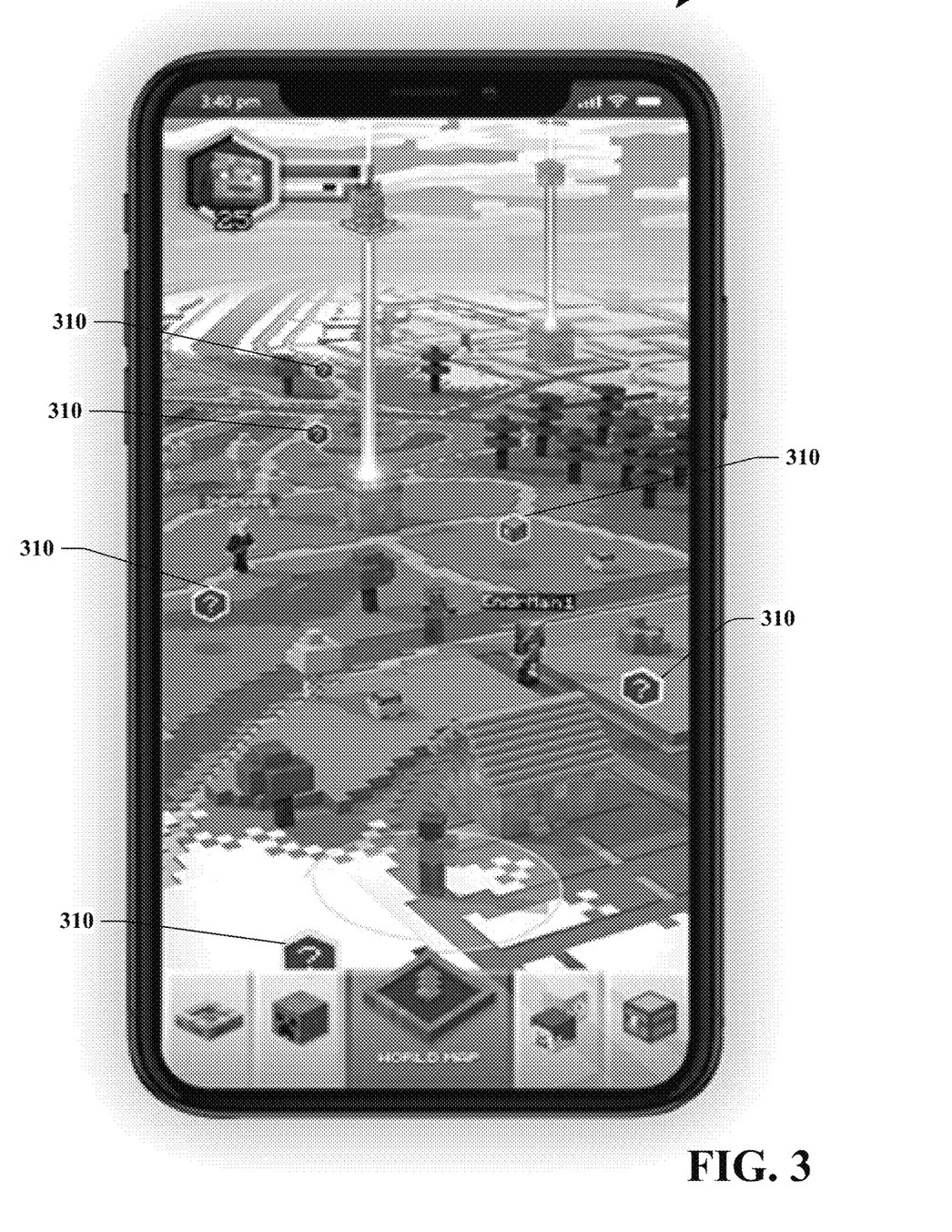
FIG. 3 is a diagram that illustrates another exemplary user interface.

Turning to FIG. 3, another exemplary user interface 300 is illustrated. The user interface 300 displays a map of a virtual environment that parallels at least portions of a physical environment. The user interface 300 includes a plurality of interactive virtual items 310 displayed at various locations. The user can interact with zero, one or more of the interactive virtual items 310.

Referring back to FIG. 1, the system 100 can gather information regarding users' interactions with the virtual items (or lack thereof). The information can include a location of the user gaming device 110 when interaction with a particular virtual item occurred. In some embodiments, the information can further include a distance (e.g., offset) of the user gaming device 110 from the particular virtual item when the interaction occurred. For example, the system 100 can capture the latitude and longitude provided by GPS of players who access the particular virtual item, as well as their offset from the location associated with the particular virtual item when the interaction occurred.

In some embodiments, the system 100 can further gather information regarding the user's interaction with an augmented reality experience system (e.g., augmented reality video game system), and/or a virtual reality experience system. This information can include, for example, the user's physical location (e.g., location of the user gaming device 110) when the user initiated a particular augmented reality experience and/or a particular virtual reality experience.

The system 100 can aggregate the received information (e.g., over time) to infer/determine an associated physical location within the physical environment for virtual item(s). The system 100 can further place the virtual item(s) at the inferred/determined associated physical location (e.g., associate a physical location with the particular virtual item(s)).

In some embodiments, the system 100 infers/determines locations for the interactive virtual items that were initially place using the initial placement algorithms. In some embodiments, the system 100 infers/determines locations for other virtual item(s). For example, the system 100 can infer/determine a location to place a three-dimensional hologram to be experienced in a virtual reality environment and/or an augmented reality environment.

In some embodiments, the system 100 infers/determines locations for other interactive virtual item(s). For example, the system 100 can infer/determine a location to place a particular three-dimensional encounter to be experienced in an augmented reality environment.

In some embodiments, the system 100 can utilize the received information (e.g., over time) to observe characteristic(s) associated with a particular physical location (e.g., a park). For example, based upon information received over time, the system 100 can infer physical pattern(s) that can form the basis for contours of open area(s) suitable, for example, for augmented reality gaming.

Figure 4:
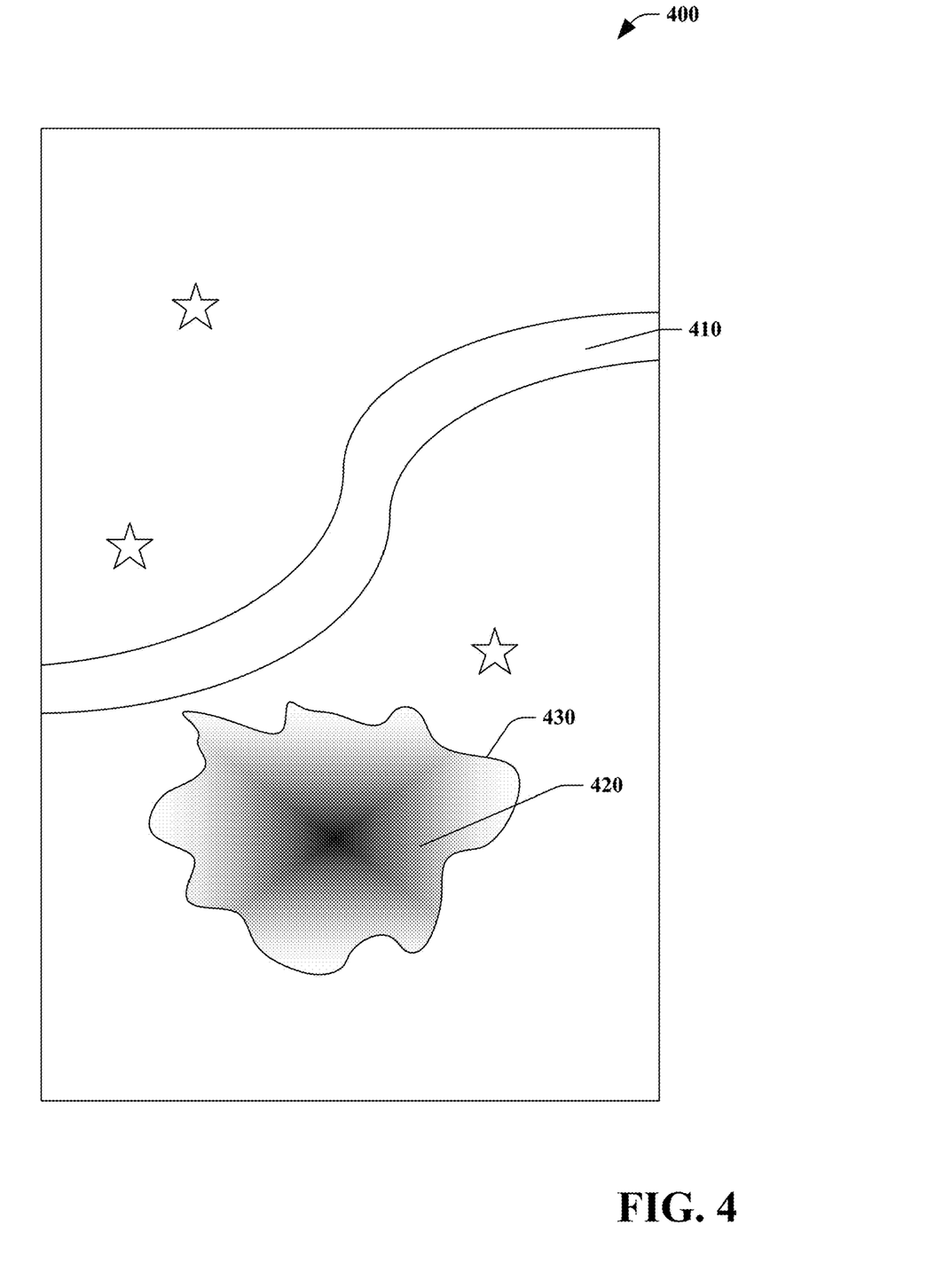
FIG. 4 is a diagram that illustrates an exemplary physical area.

Turning briefly to FIG. 4, a diagram 400 illustrating an exemplary physical area (e.g., tile) is illustrated. The diagram 400 includes a walkway 410, in accordance with received geographical information 130, for example, provided by a mapping service. The diagram 400 further includes a plurality of user interaction points 420 received over a period of time (e.g., since game inception, over past day, over past week, over past month). The system 100 can utilize these user interaction points 420 to form a contour 430 suitable for augmented reality gaming.

Referring back to FIG. 1, additionally, the system 100 can determine physical characteristics such as dimensions of these open area(s) and place particular virtual item(s) such as augmented reality video game encounters at physical location(s) meeting or exceeding a threshold size. By way of explanation and not limitation, the system 100 can determine that, based upon the received information, an open area of 50 feet by 300 feet. This open area can support a plurality of encounter locations for an augmented reality video game encounters requiring a 10 foot by 10 foot area. The system 100 can then place one or more augmented reality video game encounters within this open area.

In some embodiments, the system 100 can be utilized as part of an augmented reality video game that can be played on a user's gaming device 110 utilizing one or more camera(s) of the user's gaming device 110 (e.g., mobile phone) to provide the real world imagery with an augmented reality component of the user's gaming device (e.g., mobile phone) overlaying the virtual gaming experience. In some embodiments, the virtual gaming experience can be generated, at least in part, by a cloud-based service. In some embodiments, the virtual gaming experience can be generated, at least in part, by the user's gaming device 110.

In some embodiments, aggregating the received information 130 over time to determine the associated physical location within the physical environment for the virtual item can comprise weighting recently received information greater than less recently received information (e.g., decaying usefulness of older information). In some embodiments, aggregating the received information 130 over time to determine the associated physical location within the physical environment for the virtual item is further based on seasonality of the received information. That is, the received information 130 can include temporal and/or meteorological data. In this manner, the system 100 can take into consideration seasonal and/or weather conditions when determining associated physical location(s) within the physical environment for virtual item(s).

Figure 5:
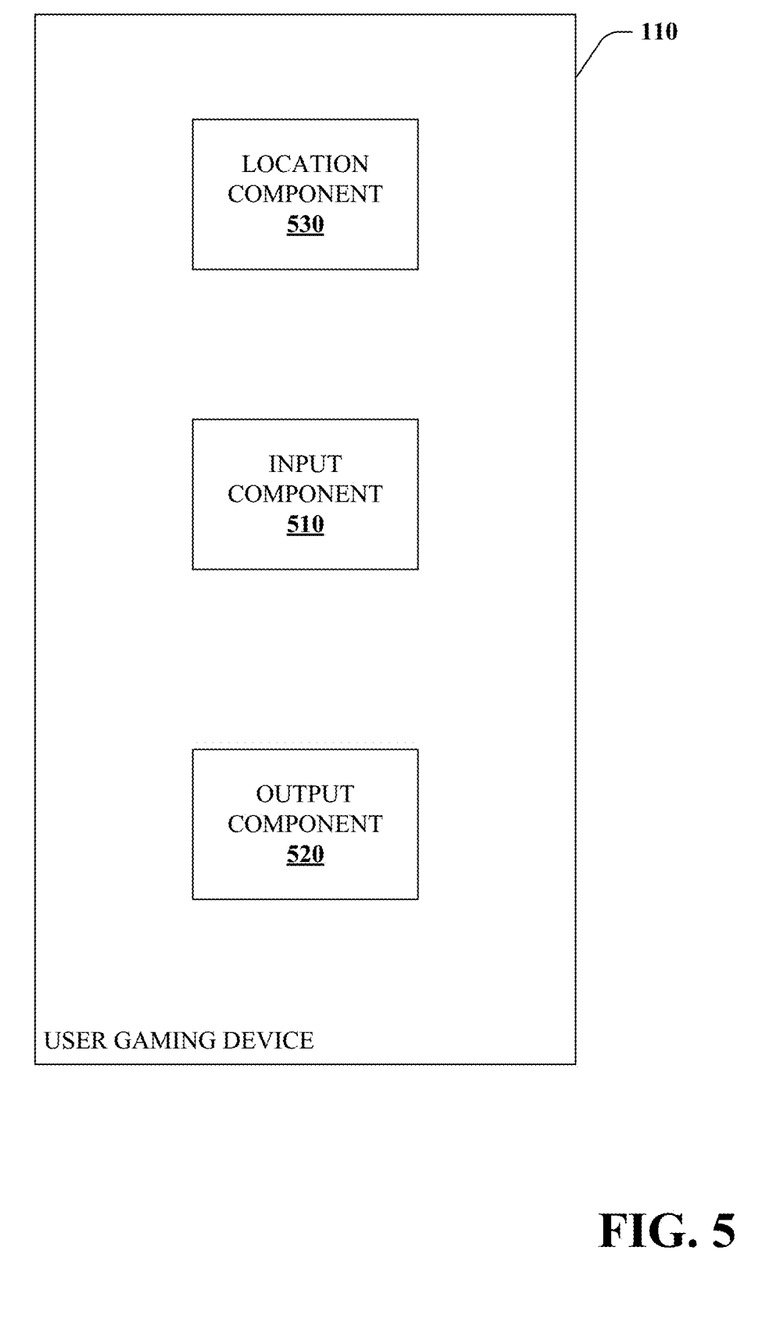
FIG. 5 is a functional block diagram that illustrates an exemplary user gaming device.

Next, referring to FIG. 5, an exemplary user gaming device 110 is illustrated. The user gaming device 110 can be, for example, a mobile phone, a laptop, a tablet, a phablet, a personal digital assistant ("PDA"), an e-reader, a wearable computer, a head-mounted display (HMD), or any other moveable computing device having components for interacting with a virtual reality system and/or an augmented reality system.

The user gaming device 110 includes an input component 510, an output component 520, and, a location component 530. The input component 510 receives user input as part of a virtual reality experience and/or an augmented reality experience. The user input can be received from one or more input devices (e.g., pointing device such as a mouse, trackball, stylus, touch pad, touchscreen, keyboard, microphone, joystick, game pad, satellite dish, scanner, camera, other computer).

The output component 520 provides user data to the user as part of the virtual reality experience and/or the augmented reality experience. The output component 520 can include a display, a touchscreen, a speaker, and the like. The location component 530 provides geolocation data regarding positioning of the user gaming device 110 to the system 100. In some embodiments, the location component 530 includes a GPS-global positioning system of a user's mobile phone.

Figure 6:
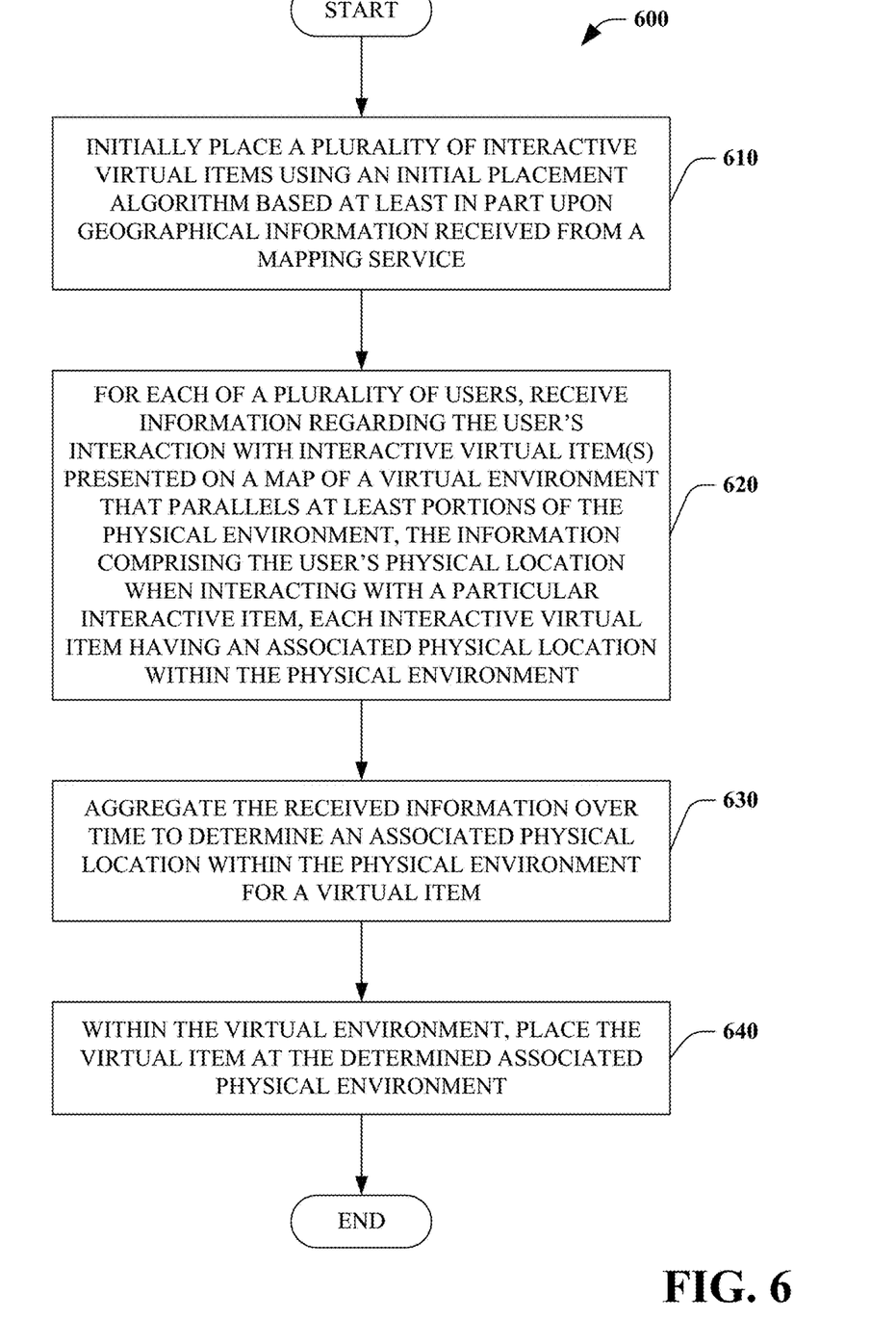
FIG. 6 is a flow chart that illustrates an exemplary methodology of identifying location(s) for virtual item(s) within a physical environment.

FIG. 6 illustrates an exemplary methodology relating to identifying location(s) for virtual item(s) within a physical environment. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 6, a method of identifying location(s) for virtual item(s) within a physical environment is illustrated. In some embodiments, the method 600 is performed by the system 100.

At 610, a plurality of interactive virtual items are initially placed using an initial placement algorithm based, at least in part, upon geographical information received from a mapping service. At 620, for each of a plurality of users, information is received regarding the user's interaction with interactive virtual item(s) presented (e.g., displayed) on a map of a virtual environment that parallels at least portions of the physical environment. The information comprises the user's physical location when interacting with a particular interactive virtual item. Each interactive virtual item has an associated physical location within the physical environment.

At 630, the received information is aggregated over time to determine an associated physical location within the physical environment for the virtual item. At 640, within the virtual environment, the virtual item is placed at the determined associated physical location.

Described herein is a system for identifying a location for a virtual item within a physical environment, comprising: a computer comprising a processor and a memory having computer-executable instructions stored thereupon which, when executed by the processor, cause the computer to: for each of a plurality of users, receiving information regarding the user's interaction with one or more interactive virtual items presented on a map of a virtual environment that parallels at least portions of the physical environment, the information comprising the user's physical location when interacting with a particular interactive item, each interactive virtual item having an associated physical location within the physical environment; aggregating the received information over time to determine an associated physical location within the physical environment for the virtual item; and within the virtual environment, placing the virtual item at the determined associated physical location.

The system can further include wherein the interactive virtual items are initially placed using an initial placement algorithm that, based, at least in part, upon geographical information received from a mapping service, identifies locations in which gaming is not expected to occur. The system can further include wherein the interactive virtual items are initially placed using an initial placement algorithm that, based, at least in part, upon geographical information received from a mapping service, identifies locations in which gaming is expected to occur. The system can further include wherein the interactive virtual items are initially placed using an initial placement algorithm that, based, at least in, part upon geographical information received from a mapping service, identifies locations in which the system cannot initially infer whether or not gaming is expected to occur.

The system can further include wherein the interactive virtual items are initially placed using a pattern to disperse the interactive virtual items across a particular geographical area. The system can further include wherein the interactive virtual items are initially placed in a random pattern across a particular geographical area. The system can further include wherein aggregating the received information over time to determine the associated physical location within the physical environment for the virtual item comprises weighting recently received information greater than less recently received information.

The system can further include wherein aggregating the received information over time to determine the associated physical location within the physical environment for the virtual item is further based on seasonality of the received information. The system can further include wherein associated physical location within the physical environment interactive of at least some of the interactive virtual items are moved as a function of time.

The system can further include wherein the virtual item comprises one of the interactive virtual items. The system can further include wherein the virtual item comprises an augmented reality video game encounter displaying an interactive, three-dimensional virtual object. The system can further include wherein the information is received from a user gaming device comprising a mobile phone.

Described herein is a method of locating a virtual item, comprising: for each of a plurality of users, receiving information regarding the user's interaction with a one or more interactive virtual items presented on a map of a virtual environment that parallels at least portions of the physical environment, the information comprising the user's physical location when interacting with a particular interactive item, each interactive virtual item having an associated physical location within the physical environment; aggregating the received information over time to determine an associated physical location within the physical environment for the virtual item; and within the virtual environment, placing the virtual item at the determined associated physical location.

The method can further include wherein the interactive virtual items are initially placed using an initial placement algorithm that, based, at least in part, upon geographical information received from a mapping service, identifies locations in which gaming is not expected to occur, locations in which gaming is expected to occur, and locations in which the system cannot initially infer whether or not gaming is expected to occur.

The method can further include wherein aggregating the received information over time to determine the associated physical location within the physical environment for the virtual item comprises weighting recently received information greater than less recently received information. The method can further include wherein aggregating the received information over time to determine the associated physical location within the physical environment for the virtual item is further based on seasonality of the received information. The method can further include wherein the virtual item comprises an augmented reality video game encounter displaying an interactive, three-dimensional virtual object.

Described herein is a computer storage media storing computer-readable instructions that when executed cause a computing device to: for each of a plurality of users, receive information regarding the user's interaction with a one or more interactive virtual items presented on a map of a virtual environment that parallels at least portions of the physical environment, the information comprising the user's physical location when interacting with a particular interactive item, each interactive virtual item having an associated physical location within the physical environment; aggregate the received information over time to determine an associated physical location within the physical environment for a virtual item; and within the virtual environment, place the virtual item at the determined associated physical location.

The computer storage media can further include wherein the interactive virtual items are initially placed using an initial placement algorithm that, based, at least in part, upon geographical information received from a mapping service, identifies locations in which gaming is not expected to occur, locations in which gaming is expected to occur, and locations in which the system cannot initially infer whether or not gaming is expected to occur. The computer storage media can further include wherein aggregating the received information over time to determine the associated physical location within the physical environment for the virtual item comprises weighting recently received information greater than less recently received information.

Figure 7:
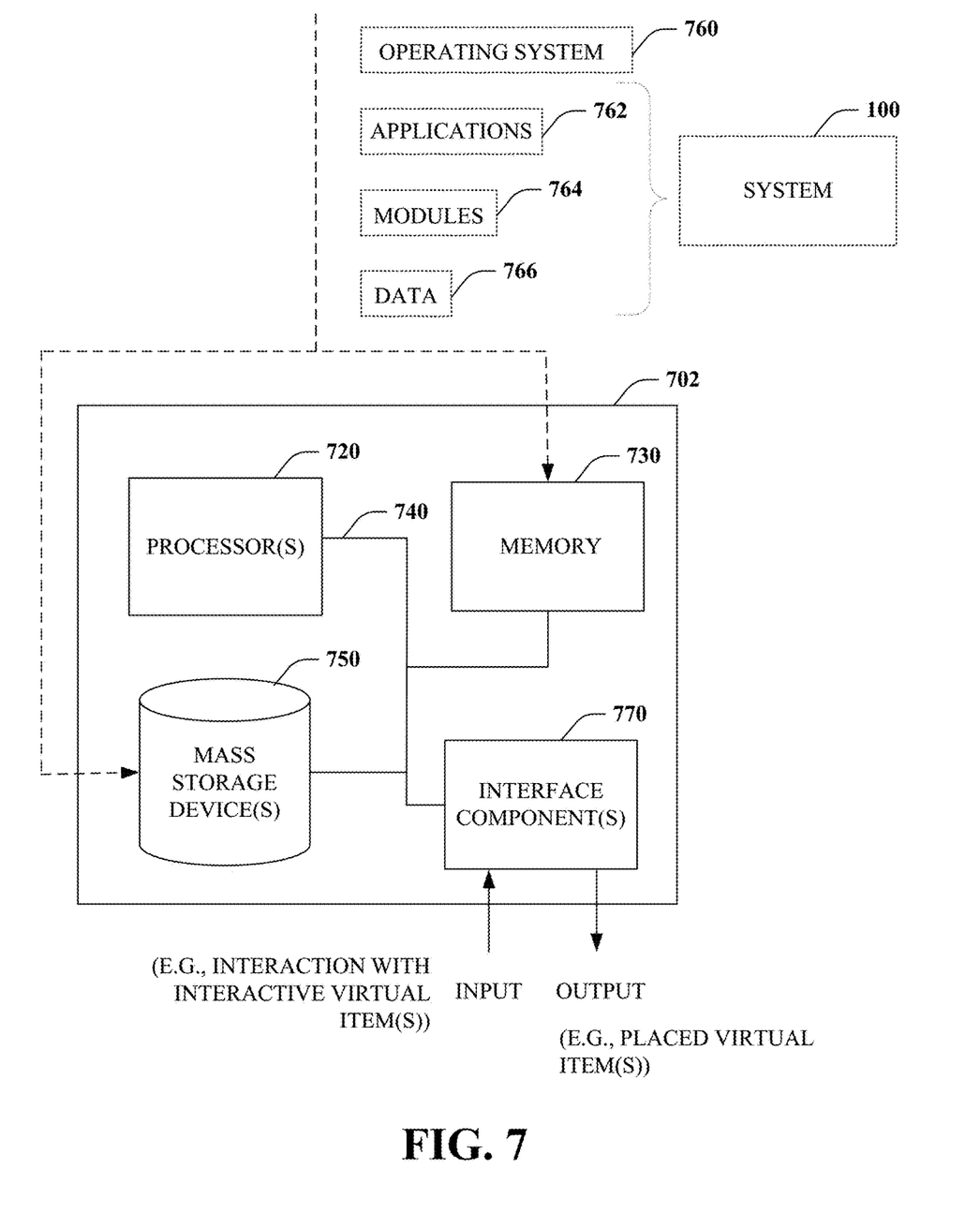
FIG. 7 is a functional block diagram that illustrates an exemplary computing system.

With reference to FIG. 7, illustrated is an example general-purpose computer or computing device 702 (e.g., mobile phone, desktop, laptop, tablet, watch, server, handheld, programmable consumer or industrial electronics, set-top box, game system, compute node, etc.). For instance, the computing device 702 may be used in a system for identifying locations for virtual items within a physical environment 100.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device(s) 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system for identifying a location for a virtual item within a physical environment, comprising:
    a processor; and
    a memory having computer-executable instructions stored thereupon which, when executed by the processor, cause the processor to:
    place one or more interactive virtual items on a map of a virtual environment that parallels at least portions of the physical environment based at least on geographical information associated with the physical environment, the one or more interactive virtual items are initially placed using a pattern to disperse the one or more interactive virtual items within the virtual environment;
    receive information associated with a plurality of users regarding user interaction with the one or more interactive virtual items, the information comprising physical locations of individual users when interacting with the one or more interactive virtual items, the one or more interactive virtual items having an associated physical location within the physical environment;
    aggregate the received information over time to determine an associated physical location within the physical environment for the virtual item; and
    within the virtual environment, placing the virtual item at the determined associated physical location.

2. The system of claim 1, wherein the one or more interactive virtual items are initially placed using an initial placement algorithm that identifies locations in which gaming is not expected to occur, based at least in part upon geographical information received from a mapping service.

3. The system of claim 1, wherein the one or more interactive virtual items are initially placed using an initial placement algorithm that identifies locations in which gaming is expected to occur, based at least in part upon geographical information received from a mapping service.

4. The system of claim 1, wherein the one or more interactive virtual items are initially placed using an initial placement algorithm that identifies locations in which the system cannot initially infer whether or not gaming is expected to occur, based at least in part upon geographical information received from a mapping service.

5. The system of claim 1, wherein the pattern is a random pattern that randomly disperses the one or more interactive virtual items within the virtual environment.

6. The system of claim 1, wherein aggregating the received information over time to determine the associated physical location within the physical environment for the virtual item comprises weighting recently received information greater than less recently received information.

7. The system of claim 1, wherein aggregating the received information over time to determine the associated physical location within the physical environment for the virtual item is further based on seasonality of the received information.

8. The system of claim 1, wherein the one or more interactive virtual items can be moved as a function of time.

9. The system of claim 1, wherein the virtual item is an additional virtual item placed in addition to the one or more interactive virtual items.

10. The system of claim 1, wherein the virtual item comprises an augmented reality video game encounter displaying an interactive, three-dimensional virtual object.

11. The system of claim 1, wherein the information is received from a user gaming device comprising a mobile phone.

12. A method of locating a virtual item, comprising:
placing one or more interactive virtual items on a map of a virtual environment that parallels at least portions of a physical environment based at least on geographical information associated with the physical environment, the one or more interactive virtual items are initially placed using a pattern to disperse the one or more interactive virtual items within the virtual environment;
receiving information associated with a plurality of users regarding user interaction with the one or more interactive virtual items, the information comprising physical locations of individual users when interacting with the one or more interactive virtual items, the one or more interactive virtual items having an associated physical location within the physical environment;
aggregating the received information over time to determine an associated physical location within the physical environment for the virtual item; and
within the virtual environment, placing the virtual item at the determined associated physical location.

13. The method of claim 12, wherein the one or more interactive virtual items are initially placed using an initial placement algorithm that identifies locations in which gaming is not expected to occur, locations in which gaming is expected to occur, and locations in which an inference cannot be initially made as to whether or not gaming is expected to occur, based at least in part upon geographical information received from a mapping source.

14. The method of claim 12, wherein aggregating the received information over time to determine the associated physical location within the physical environment for the virtual item comprises weighting recently received information greater than less recently received information.

15. The method of claim 12, wherein aggregating the received information over time to determine the associated physical location within the physical environment for the virtual item is further based on seasonality of the received information.

16. The method of claim 12, wherein the virtual item comprises an augmented reality video game encounter displaying an interactive, three-dimensional virtual object.

17. A computer storage media storing computer-readable instructions that when executed cause a computing device to:
place one or more interactive virtual items on a map of a virtual environment that parallels at least portions of a physical environment based at least on geographical information associated with the physical environment, the one or more interactive virtual items are initially placed using a pattern to disperse the one or more interactive virtual items within the virtual environment;
receive information associated with a plurality of users regarding user interaction with the one or more interactive virtual items, the information comprising physical locations of individual users when interacting with the one or more interactive virtual items, the one or more interactive virtual items having an associated physical location within the physical environment;
aggregate the received information over time to determine an associated physical location within the physical environment for a virtual item; and
within the virtual environment, place the virtual item at the determined associated physical location.

18. The computer storage media of claim 17, wherein the one or more interactive virtual items are initially placed using an initial placement algorithm that identifies locations in which gaming is not expected to occur, locations in which gaming is expected to occur, and locations in which an inference cannot be initially made as to whether or not gaming is expected to occur, based at least in part upon geographical information received from a mapping service.

19. The computer storage media of claim 17, wherein aggregating the received information over time to determine the associated physical location within the physical environment for the virtual item comprises weighting recently received information greater than less recently received information.

* * * * *